US005412998A

United States Patent [19]

Nakamoto et al.

[11] Patent Number: 5,412,998

[45] Date of Patent: May 9, 1995

[54] TORQUE MEASURING SYSTEM

[75] Inventors: Akira Nakamoto; Shiro Takada; Akiyoshi Hanazawa; Kazunori Sakunaga; Takuji Mori; Taro Saito; Mutsumi Sunahata, all of Yao, Japan

[73] Assignee: Kubota Corporation, Japan

[21] Appl. No.: 121,791

[22] Filed: Sep. 15, 1993

[30] Foreign Application Priority Data

Oct. 8, 1992 [JP] Japan ................................ 4-269804

[51] Int. Cl.$^6$ ................................................ G01F 1/00

[52] U.S. Cl. .......................... 73/862.335; 73/862.333

[58] Field of Search .................... 73/862.333, 862.334, 73/862.335, 862.336

[56] References Cited

U.S. PATENT DOCUMENTS 4,616,512 10/1986 Himmelstein et al. ........... 73/862.36

4,920,809 5/1990 Yoshimura et al. ............ 73/862.334

4,972,727 11/1990 Yoshimura et al. ............ 73/862.334

*Primary Examiner*—Richard E. Chilcot, Jr.

*Assistant Examiner*—R. Biegel

*Attorney, Agent, or Firm*—D. Peter Hochberg; Mark Kusner; Michael Jaffe

[57] ABSTRACT

A torque measuring system can detect the magnitude of a torque applied to a torque sensing shaft and output a torque signal with respect to the torque. A torque sensor of the system has a measurement mode for producing torque signals and a correction mode for correction of its detection characteristics. An external signal for selection of one of the two modes is supplied to the torque sensor by a characteristic check device. The correction mode enables the correction of the torque sensor characteristics to be effected accurately and in a short time period without requiring manual labor.

14 Claims, 12 Drawing Sheets

F I G. 1
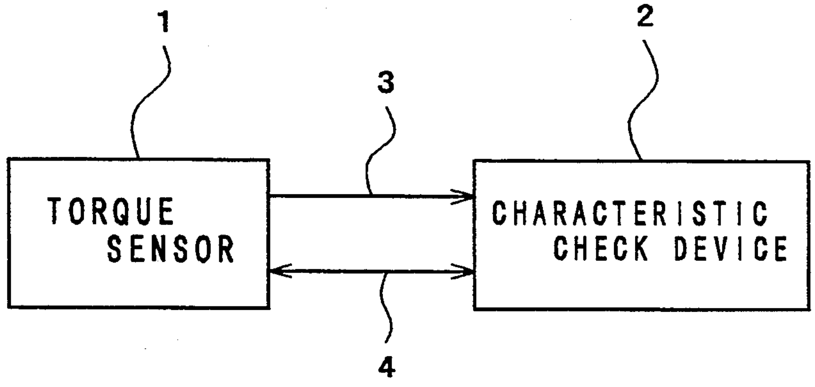

TORQUE MEASURING SYSTEM

FIELD OF THE INVENTION

The present invention relates to a torque measuring system for detecting the magnitude of a torque applied to a torque sensing shaft and producing a signal for the torque.

BACKGROUND OF THE INVENTION

A torque measuring system has been known which is of the type having a pair of magnetically anisotropic portions formed on the periphery of a torque transmission shaft such that when a torque is applied to the shaft, a pair of sensing coils arranged adjacent the magnetically anisotropic portions detect a change in the permeability of the portions and issue detection signals individually so that on the basis of the difference between the two signals the magnitude of the torque acting on the shaft is converted into an electric signal.

With such prior-art torque measuring system, the problem is that sensor outputs in such a condition that no torque is acting on the shaft, that is, zero-point outputs, and/or detection sensitivity of the sensor are subject to variation under the influence of the ambient temperature condition and various other factors.

Among possible causes of such variation in sensor output are unbalance of magnetically anisotropic portions formed on the shaft at opposite locations, unbalance in characteristics of shields disposed at opposite locations, and unbalance in characteristics of bobbins and coils arranged at opposite locations. For example, where the magnetically anisotropic portions are formed by knurl groove rolling and subsequently subjecting the worked knurl grooves to heat treatment and shot peening, the unbalance of the magnetically anisotropic portions may be attributable to unbalance of the rolled grooves in respect of groove depth and width, unbalance of heat treatment, and/or unbalance of shot peening operation.

As a measure to correct such variation in sensor outputs, it has been known to provide correction resistors such that when there occurs a change the correction resistors may be replaced through soldering, or selectively used through a dip switch control, or adjusted by means of variable resistors, as described in, for example, Japanese Patent Application No. 3-311137.

However, such prior art correction practice has involved the problem that correction is carried out by manually replacing and/or adjusting electronic parts, which often results in inaccurate correction and which is time consuming.

DISCLOSURE OF THE INVENTION

The object of the present invention is to enable the characteristic correction of torque sensors to be carried out accurately and in short time without requiring manual replacement or adjustment of electronic parts operation.

In order to accomplish this object, the torque measuring system in accordance with the present invention comprises a torque sensor which can detect the magnitude of a torque applied to a torque sensing shaft and can output a torque signal therefor, said torque measuring system being operable to set a correction mode for correcting the detecting characteristics of the torque sensor and a measurement mode for outputting a torque signal from the torque sensor whose detecting characteristics have been corrected in correction mode, said torque sensor having means for receiving an external signal for selecting one of the two modes.

According to such arrangement, the correction mode is first selected for correcting the detecting characteristics of the torque sensor and then the measurement mode is selected for measurement by the torque sensor whose detecting characteristics have been corrected on the basis of the correction made. Thus, the detecting characteristics of the torque sensor can be automatically corrected and such correction can be made accurately and in short time without requiring any manual replacement and/or adjustment of electronic parts.

BRIEF DESCRIPTION OF THE DRAWINGS

FIG. 1 is a schematic diagram showing a torque measuring system representing one embodiment of the present invention;

DESCRIPTION OF THE EMBODIMENTS

In FIG. 1, numeral 1 designates a torque sensor and numeral 2 designates a characteristic check device, which are interconnected through a torque signal line 3 and a data input/output line 4. The characteristic check device 2 includes a computer system.

Figure 2:
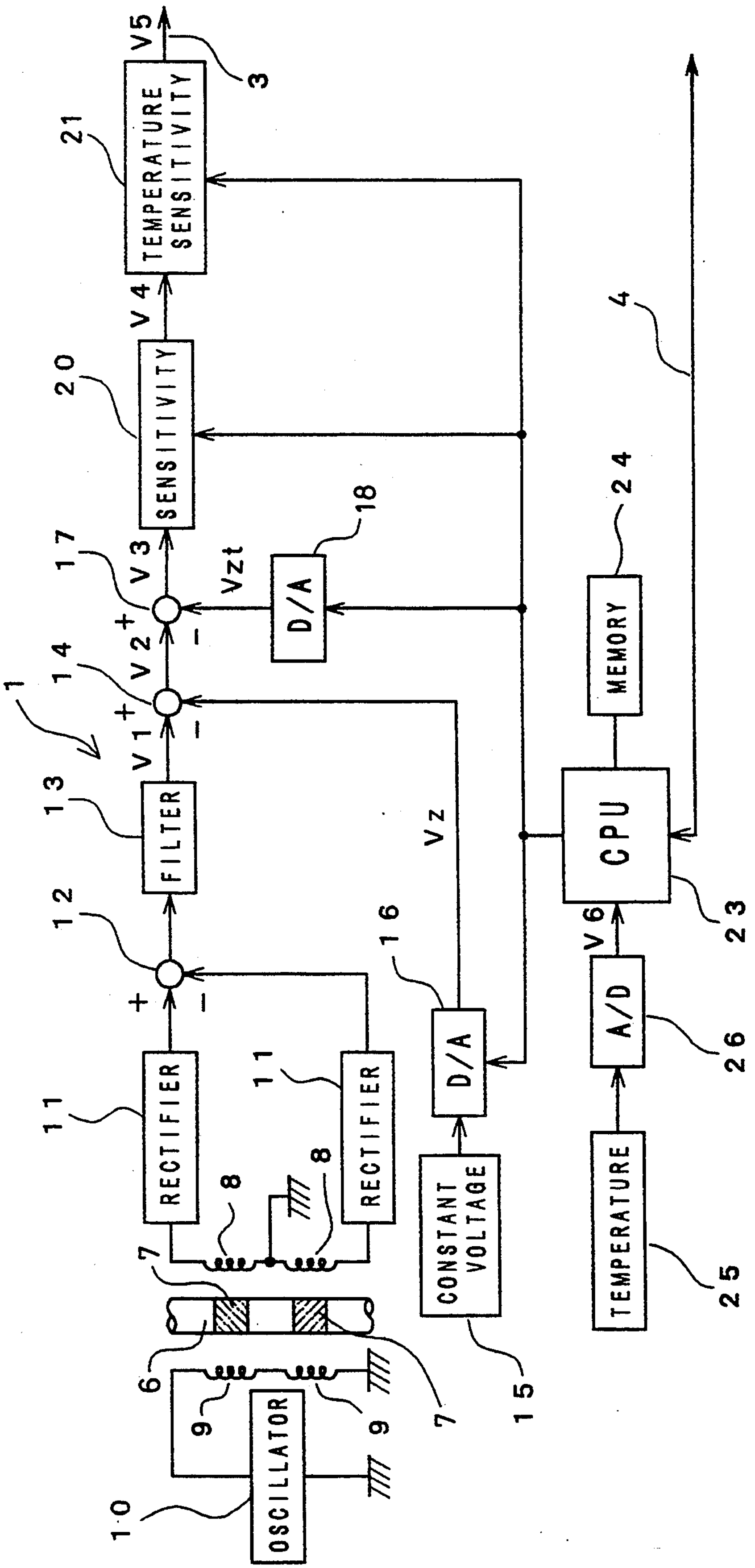
FIG. 2 is a block diagram showing a torque sensor of the analog correction type.

FIG. 2 shows a detailed arrangement of a torque sensor 1 of the analog correction type. In the figure, numeral 6 designates a torque sensing shaft which is made from a material having magnetically soft and mognetostrictive characteristics. On the periphery of the shaft 6 there are defined a pair of magnetically anisotropic portions 7, 7 by multiplicities of grooves and the like, the magnetically anisotropic portions being inclined at angles of about ±45 degrees relative to the axis of the shaft 6 and in directions opposite from each other. The multiplicities of grooves may be formed, for example, by rolling the shaft 6, and after so formed they may be subjected to heat treatment and/or shot peening for characteristic improvement.

Around the magnetically anisotropic portions 7, 7 are provided a pair of sensing coils 8, 8 corresponding to respective magnetically anisotropic portions 7, 7 and excitation coils 9, 9 for exciting the sensing coils 8, 8.

The excitation coils 9, 9 are connected to an oscillation circuit 10 for alternating current supply.

Output lines from respective sensing coils 8, 8 are connected respectively through rectifier circuits 11, 11 to a differential amplifier 12. An output line from the differential amplifier 12 is connected to a differential amplifier 14 for zero-point adjustment via a filter 13. The differential amplifier 12 receives through a D/A converter 16 provided with a constant voltage generating circuit 15 a signal Vz for zeroing the sensor output at the time of zero torque. Shown by V2 is an output signal from the differential amplifier 14.

An output line from the differential amplifier 14 is connected to a differential amplifier 17 for correction of zero-point fluctuations due to temperature changes. An output line from a D/A converter 18 is connected to the differential amplifier 17. Shown by Vzt is an output signal from the converter. Character V3 represents an output signal from the differential amplifier 17.

An output line from the differential amplifier 17 is connected to a D/A converter 20 for sensitivity adjustment. An output line from the D/A converter 20 is connected to a D/A converter 21 for correction of sensitivity variations due to temperature changes. Shown by V4 is an output signal from the D/A converter 20. The above mentioned torque signal line 3 is connected to the output of the D/A converter 21, the signal line 3 being supplied with a signal V5.

Connected to the D/A converters 16, 18, 20, 21 each is an output line from a CPU 23 provided within the torque sensor 1 so that each D/A converter can receive correction data sent from the CPU 2B. A memory 24 is provided in conjunction with the CPU 23 for storing various kinds of correction data inherently related to the torque sensor 1. The earlier mentioned data input/output line 4 is connected to the CPU 23. Shown at 25 is a temperature sensor which can detect the temperature at the torque sensor 1. An output line from the temperature sensor 25 is connected to the CPU 23 through an A/D converter 26. Shown by V6 is an output signal from the A/D converter 26.

According to such arrangement, the torque sensor 1 is alternatively switchable from a first mode, or a measurement mode to a second mode, or a correction mode and vice versa. A switching signal for this purpose is sent from the characteristic check device 2 to the CPU 23 via the data input/output line 4 while the characteristic check device 2 is connected to the torque sensor 1. The CPU 23 operates in response to the switching signal.

In the correction mode, the torque sensor 1 which is subject to correction is connected to the characteristic check device 2 as shown in FIG. 1 and a predetermined torque is applied to the torque sensing shaft 6 under predetermined temperature conditions. The torque sensor 1 responds accordingly so that a signal V5 appears on the torque signal line 3, which signal V5 is read by the characteristic check device 2. From the output signal V5 of the torque sensor 1, subject to correction under the predetermined temperature and torque conditions, does the characteristic check device 2 calculate correction data for correcting the torque sensor 1. The calculated correction data is written into the memory 24 via the data input/output line 4 and CPU 23.

In the measurement mode after the correction mode, the torque sensor 1 is isolated from the characteristic check device 2 for use. When a torque is applied to the shaft 6, the sensing coils 8, 8 output signals in response thereto and, on the basis of the output signals, calculation is made for a torque signal corresponding to the magnitude of the torque applied to the shaft 6. This torque signal is subjected to a series of corrections based on correction data read by the CPU 23 from the memory 24 and the corrected torque signal is output as signal V5 to the torque signal line 3.

Correction of characteristics of the torque sensor 1 under the correction mode is carried out at the stage of the torque sensor being manufactured at the manufacturing factory, as well as for maintenance and checking with respect to the torque sensor when in actual use. With the torque sensor illustrated in FIG. 2, in the measurement mode, at least one of different kinds of correction including zero-point correction, sensitivity correction, correction of zero-point variations due to temperature changes, and correction of sensitivity variations due to temperature changes, is made in an analog fashion with respect to a torque signal, as required, on the basis of correction data obtained in the correction mode.

First, zero-point correction, or zero-balance correction, will be explained. For the purpose of such a correction, in the correction mode, at an ordinary temperature, for example, 25° C., an output signal V1 indicative of no torque being applied to the shaft 6 is supplied, as it is, to the torque signal line 3, and the value of the signal is measured at the characteristic check device 2. Zero-point correction data for the sensor is calculated from the measured data, and the result of the calculation is supplied from the data input/output line 4 and via the CPU 23 to the memory 24 in the sensor 1 for being written thereinto. The CPU 23, in the measurement mode, reads the zero-point correction data from the memory 24 to write same into the D/A converter 16. Then, output Vz of the D/A converter 16 will be Vz=V1, whereby zero-point correction is made. In this case, V2=V3=V4=V5=0.

Nextly, the process of sensitivity correction will be explained. In the correction mode, a constant torque is applied to the shaft 6 at ordinary temperature, for example, at 25° C., and an output signal with respect to the torque is measured at the characteristic check device 2. Sensor sensitivity correction data is calculated from the measurement data, and the correction data is supplied from the data input/output line 4 and via the CPU 23 to the memory 24 in the sensor 1 for being written thereinto. In the measurement mode, the CPU 23 reads the sensor sensitivity correction data from the memory 24 to write same into the D/A converter 20. Then, output V4 of the D/A converter 20 is a constant voltage value corresponding to the rated torque, whereby sensitivity corresction is made.

Nextly, the process of correcting zero-point variations due to temperature changes will be explained. First, in the correction mode, the torque sensor 1 is placed in a thermostatic chamber and the temperature of the bath is changed with no load applied to the shaft 6. Output V5 of the sensor at this time is measured by the characteristic check device 2. At same time, output V6 of the temperature sensor 25 in the torque sensor 1 is measured by the characteristic check device 2 via the CPU 23 and data input/output line 4. The characteristic check device 2 calculates data for correction of zero-point variations due to temperature changes from these measured data, and the results of the calculation are supplied from the data input/output line 4 and via the operation CPU 23 to the memory 24 in the sensor 1 for being written thereinto.

In the measurement mode, when a change occurs in the ambient temperature of the torque sensor 1, output V6 of the temperature sensor 25 in the sensor will change accordingly. Then, the CPU 23 reads from the memory 24 data for correction of a zero-point change due to the temperature change and the data is written into the D/A converter 18. Therefore, even when there is a change in the ambient temperature of the sensor 1, output V5 of the sensor, in the state of no torque being applied to the shaft 6, is always zero.

Nextly, the process of correcting sensitivity variations due to temperature changes will be explained. First, in the correction mode, the torque sensor 1 is placed in the thermostatic bath, and the temperature in the bath is changed, and output V5 of the sensor, or data on sensor sensitivity, in the case of a given torque being applied to the shaft 6 at varying temperatures is measured by the characteristic check device 2. At the same time, output V6 of the temperature sensor 25 in the torque sensor 1 is measured by the characteristic check device 2 via the CPU 23 and data input/output line 4. The characteristic check device 2 calculates, from the data thus measured, data for correction of sensitivity variations due to the temperature changes, and the result of the calculation is supplied from the data input/output line 4 and via the CPU 23 to the memory 24 in the sensor 1 for being written thereinto.

In the measurement mode, when there occurs a change in output V6 of the temperature sensor 25 as a result of a change in the ambient temperature of the torque sensor 1, the CPU 23, in response to the output V6 so changed, reads from the memory 24 data for correction of sensitivity change due to the temperature change and writes the data into the D/A converter 21. Therefore, correction is possible so that sensor sensitivity is always maintained constant, even when there occurs a change in the ambient temperature of the sensor 1.

In the measurement mode, as explained above, when power supply for the circuit is switched on, the CPU 23 reads from the memory 24 zero-point correction data and sensitivity correction data and write these data respectively into the D/A converters 16 and 20. Immediately upon its power supply being switched on, the CPU 23 begins to read from the memory 24, on the basis of output V6 from the temperature sensor 25, data for correction of zero-point changes due to temperature changes and data for correction of sensitivity changes due to temperature changes, and write these data respectively into the D/A converters 18 and 21.

Zero-point correction and sensitivity correction are carried out on the basis of data written into these D/A converters 16, 20. When there occurs a change in the ambient temperature of the torque sensor, correction is made so that the zero-point and sensitivity of the sensor can be maintained constant.

Figure 3:
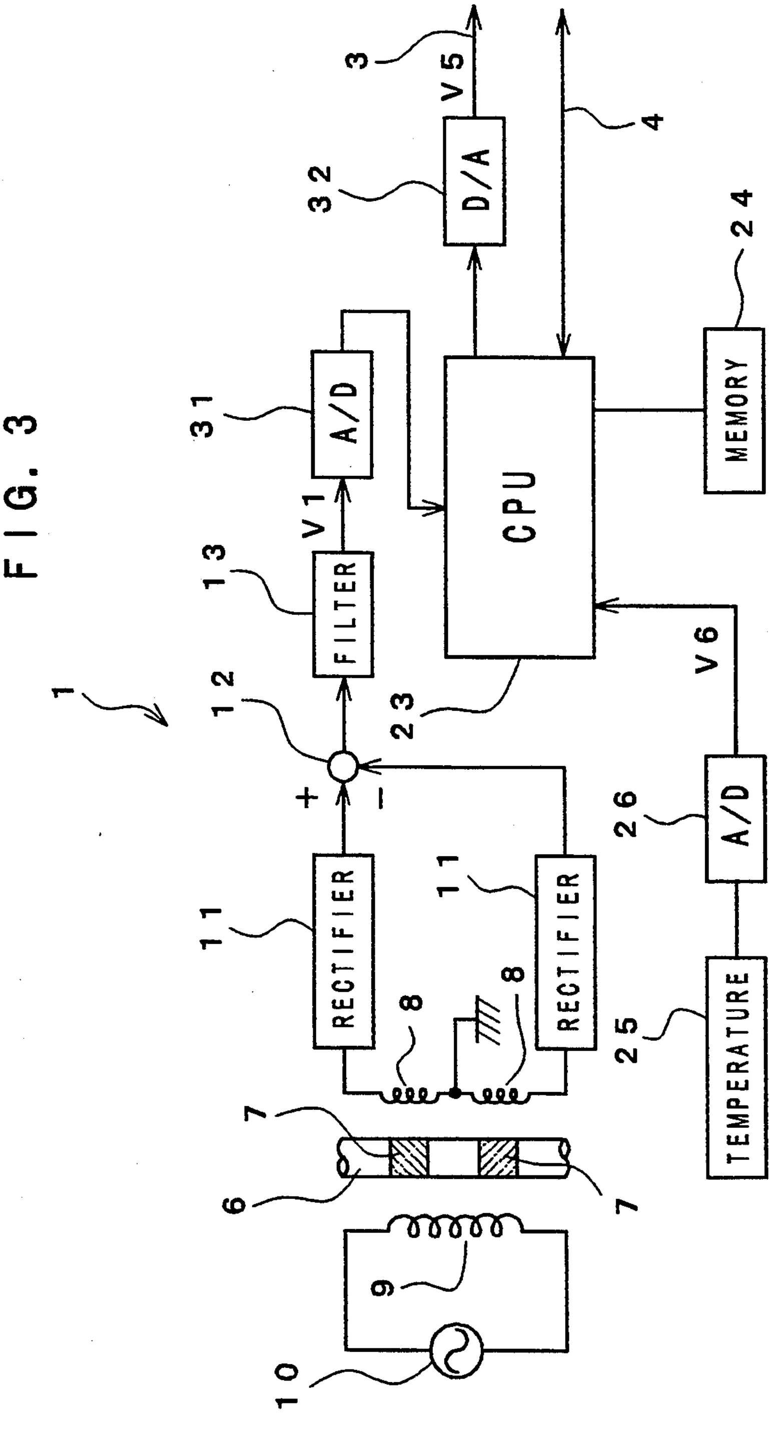
FIG. 3 is a block diagram showing a torque sensor of the digital correction type.

FIG. 3 shows detailed arrangement of a torque sensor 1 of the digital correction type. In this case, an output line from a filter 13 provided on the output side of a differential amplifier 12 is connected to a CPU 23 through an A/D converter 31. A torque signal line 3 is conducted from the CPU 23 through a D/A converter 32.

In this torque sensor 1 of the digital correction type, corrections similar to those described with respect to the analog type, including zero-point correction, sensitivity correction, correction of zero-point variations due to temperature changes, and correction of sensitivity variations due to temperature changes are carried out by digital operation in the CPU 23.

In the correction mode, as in the case of analog correction, sensor output signal V5 and output signal V6 of the temperature sensor 25 are measured at a characteristic check device 2, and on the basis of the measurement data obtained are calculated zero-point correction data, sensitivity correction data, correction data with respect to zero-point variations due to temperature changes, and correction data with respect to sensitivity variations due to temperature changes. The results of computation are written into a memory 24 in the sensor 1 via a data input/out line 4 through the CPU 23. It is noted that sensor signals, i.e., output signal V1 of the filter 1B and output signal V6 of the temperature sensor 25, can transmit those data which are converted into digital data by A/D converters 31, 26, through the CPU 23 and data input/output line 4 to the characteristic check device 2. Through this arrangement, the output and temperature of the torque sensor can be directly measured in terms of digital data at the characteristic check device 2.

In the measurement mode, when power supply is switched on, the CPU 23 reads the foregoing sets of data from the memory 24. The CPU 23 also measures output V1 for torque and output V6 for temperature and, on the basis of the foregoing data, carries out arithmetic operation with respect to a corrected torque signal and output the signal as torque signal V5.

Figure 4:
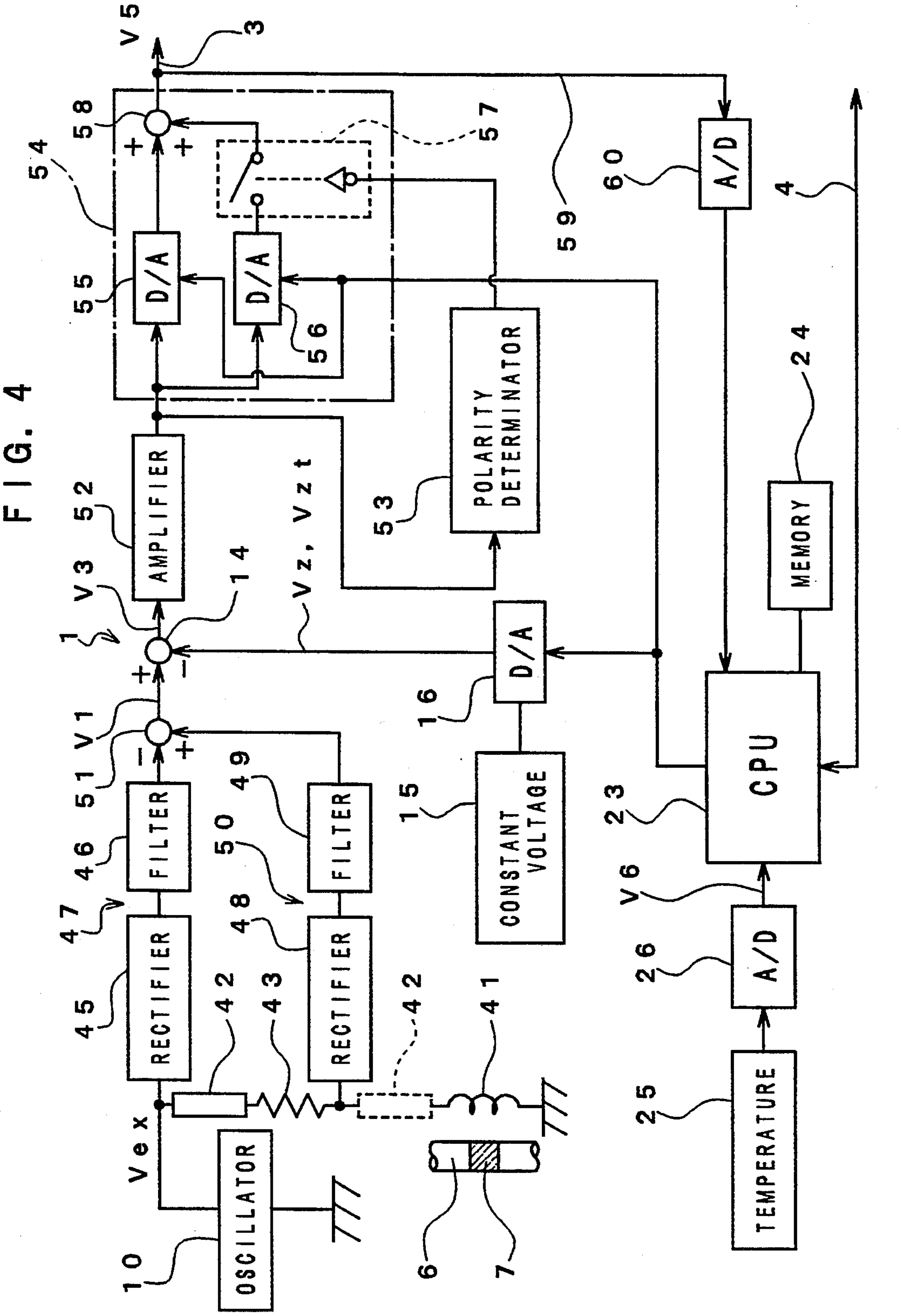
FIG. 4 is a block diagram showing a torque sensor of another analog correction type.

FIG. 4 shows a torque sensor 1 representing a modified embodiment of the invention. In this modified form, a torque sensing shaft 6 has a single magnetically anisotropic portion 7 formed on the periphery thereof, the magnetically anisotropic portion 7 being inclined relative to the axis of the shaft. A coil 41 is disposed around the magnetically anisotropic portion 7.

The coil 41 is connected to an oscillation circuit 10 for alternating-current supply to the coil 41, via a temperature sensitive resistance 42, which is shown by solid line in the figure, for coarse adjustment of zero-point variations due to temperature changes, and a resistance LB. The temperature sensitive resistance 42 may be disposed between the resistance 43 and the coil 41 as shown by broken line in the figure, or may be disposed at another location. The resistance 43 has a resistance value which is about equal to the impedance of the coil 41. A rectifier circuit 45 is connected in parallel between the oscillation circuit 10 and the temperature sensitive resistance 42, and to the output side of the rectification circuit 45 is connected a low-pass filter 46 whereby an excitation voltage sensing circuit 47 is formed.

To an output line from the coil 41, or a line parallel to the temperature sensitive resistance 42 shown by broken line in the figure are connected a rectifier circuit 48 and a lowpass filter 49 to form a torque detecting circuit 50. The output side of the low-pass filter 49 in the torque detecting circuit 50 and the output side of the low-pass filter 46 in the excitation voltage detecting circuit 47 are both connected to the input side of a differential amplifier 51. The output side of the differential amplifier 51 is connected to an amplifier 52 via a zero-point correcting differential amplifier 14.

The output side of the amplifier 52 is connected to a polarity determining circuit 53 which detects the direction of a torque applied to the torque sensing shaft 1 in known manner, and also to a gain changeover circuit 54. In the gain changeover circuit 54, a pair of D/A converters 55, 56 for sensitivity correction and correction of sensitivity variations due to temperature changes are connected in parallel, the D/A converters 55, 56 each being operative in response to a signal from the CPU 23. A switch 57 is provided in one of the parallel circuits which includes the D/A converter 56. The output side of the polarity determining circuit 53 is connected to a control signal input of the switch 57 and is operable to switch a gain in a torque detection signal from the amplifier 52 according to the direction of a torque applied to the torque sensing shaft 6. The D/A converters 55, 56 are connected at their output side to an adder 58 through which a sensor output V5 is fed to the torque signal line 3. Shown at 59 is a feedback line which is connected to the CPU 23 through an A/D converter 60.

In the foregoing arrangement, the oscillation circuit 10 supplies excitation voltage Vex to the coil 41. When torque is applied to to the torque sensing shaft 6, there occurs a change in the magnetic permeability of the magnetically anisotropic portion 7, so that the impedance of the coil is changed. In this case, the change in torque detection voltage or coil output corresponding to the change in the impedance of the coil 41 is maximized to provide a maximum torque detection sensitivity when the resistance value of the resistance 43 connected in series to the coil 41 is equal to the impedance of the coil 41. Therefore, the fact that the resistance value of the resistance 43 is about equal to the impedance of the coil 41 as earlier mentioned results in greater torque detection sensitivity.

In other words, despite the fact that the torque sensing shaft 6 has only a single magnetically anisotropic portion 7, the arrangement provides a maximum torque detection sensitivity and hence improved sensor accuracy. Therefore, the torque sensing shaft 6 can be constructed to be of a smaller length, and components of the coil 41, including bobbins for coil winding, can be reduced in number by about one half as compared with those in the embodiments shown in FIG. 2 and 3. Further, a shield case for housing them can be simplified in configuration. Thus, a torque sensor which is small in size and yet of high precision can be obtained.

When, for some reason, excitation voltage Vex varies, the output of detection voltage varies accordingly. The varying degree of the latter is equal to that of excitation voltage Vex. However, in the differential amplifier 51, the output of the filter 46 in the excitation voltage detection circuit 47 is subtracted from the output of the filter 49 in the torque detection circuit 50. This provides an advantage that whatever change has occurred in excitation voltage Vex there will be no change in torque output.

Measurement is previously made with respect to the temperature characteristics of the torque sensor output. Then, the resistance value of the temperature sensitive resistance 22, i.e., a correction constant, is determined so that output V1 of the differential amplifier 51 will be zero in the case of torque zero where no torque is applied to the torque sensing shaft 6. By so arranging it is possible to insure that even when a temperature change occurs at the torque sensor, the differential amplifier 51 will have an output V1 that is coarsely compensated for an output variation corresponding to the temperature change. That is, output V1 of the differential amplifier 51 prevents the. occurrence of any error due to a variation in the excitation voltage Vex at the oscillation circuit 10 and also generally obviates the occurrence of an error due to a temperature change.

Output V1 of the differential amplifier 51 is zero-point corrected by the differential amplifier 14, in same way as in the case of the FIG. 2 embodiment. Any zero-point variation due to a temperature change is first coarsely adjusted by the temperature sensitive resistance 42, and is then finely adjusted by the differential amplifier 14. The D/A converter 16 and differential amplifier 14 in the present embodiment concurrently have respective functions of the D/A converter 18 and differential amplifier 17 in the FIG. 2 embodiment, and the differential amplifier 14 generates output V3. In other words, in this embodiment, the D/A converter 16 performs not only zero-point correction, but also fine adjustment of any zero-point variation due to a temperature change.

Output of the amplifier 52 is input to both the gain changeover circuit 54 and the polarity determining circuit 53. Generally, where a single magnetically anisotropic portion 7 is provided, the torque detection sensitivity varies according to whether torque is applied clockwise or counterclockwise. Thus, torque output varies according to the direction of torque application. Therefore, it is arranged that the direction of applied torque is determined by the polarity determining circuit 53 from the output of the amplifier 52 and the switch 57 is opened and closed according to the direction of the applied torque.

When the switch 57 is open, only the D/A converter 55 operates to effect both sensitivity correction and correction of the sensitivity variation due to a temperature change, and a corrected output V5 is supplied from the adder 58 to the torque signal line 3. When the switch 57 is in closed state, the D/A converters 55, 56 operate to individually carry out correction, and correcting values are added by the adder 58 so that a corresponding output V5 will appear. Thus, torques can be detected with uniform sensitivity irrespective of their directions. That is, torques in opposite directions can be properly detected before they are finally output. In the present embodiment, outputs V5, as final detected torque values are input to the CPU 23 via the A/D converter 60 for being utilized for respective correction purposes.

Figure 5:
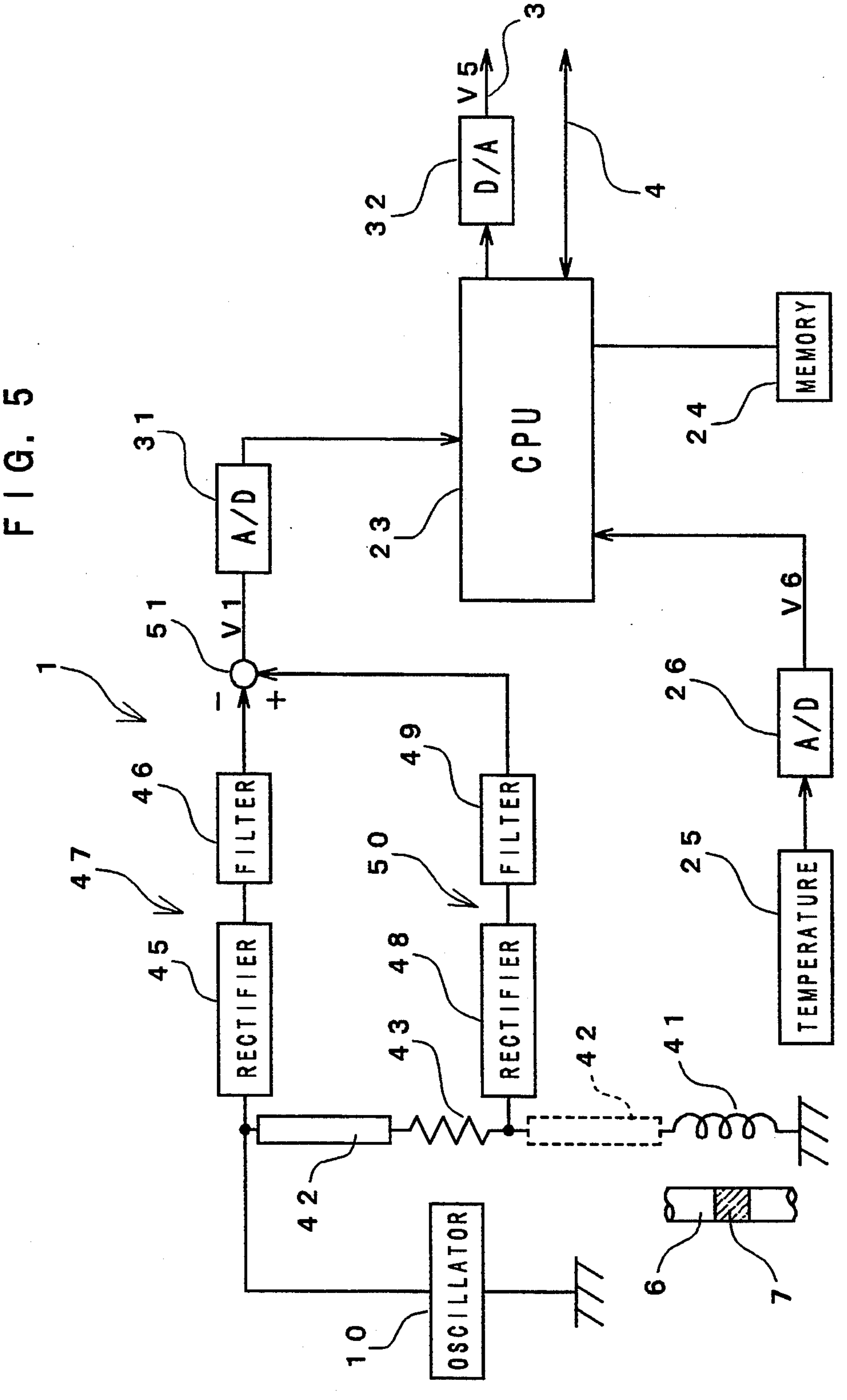
FIG. 5 is a block diagram showing a torque sensor of another digital correction type.

FIG. 5 illustrates another modified embodiment of the invention wherein a single magnetically anisotropic portion 7 is provided which corresponds to the one shown in FIG. 4, but wherein a digital correction type arrangement is employed as in the FIG. 3 embodiment. The manner of operation with respect to the embodiment is same as that in the FIG. 3 and FIG. 4 embodiments.

Figure 6:
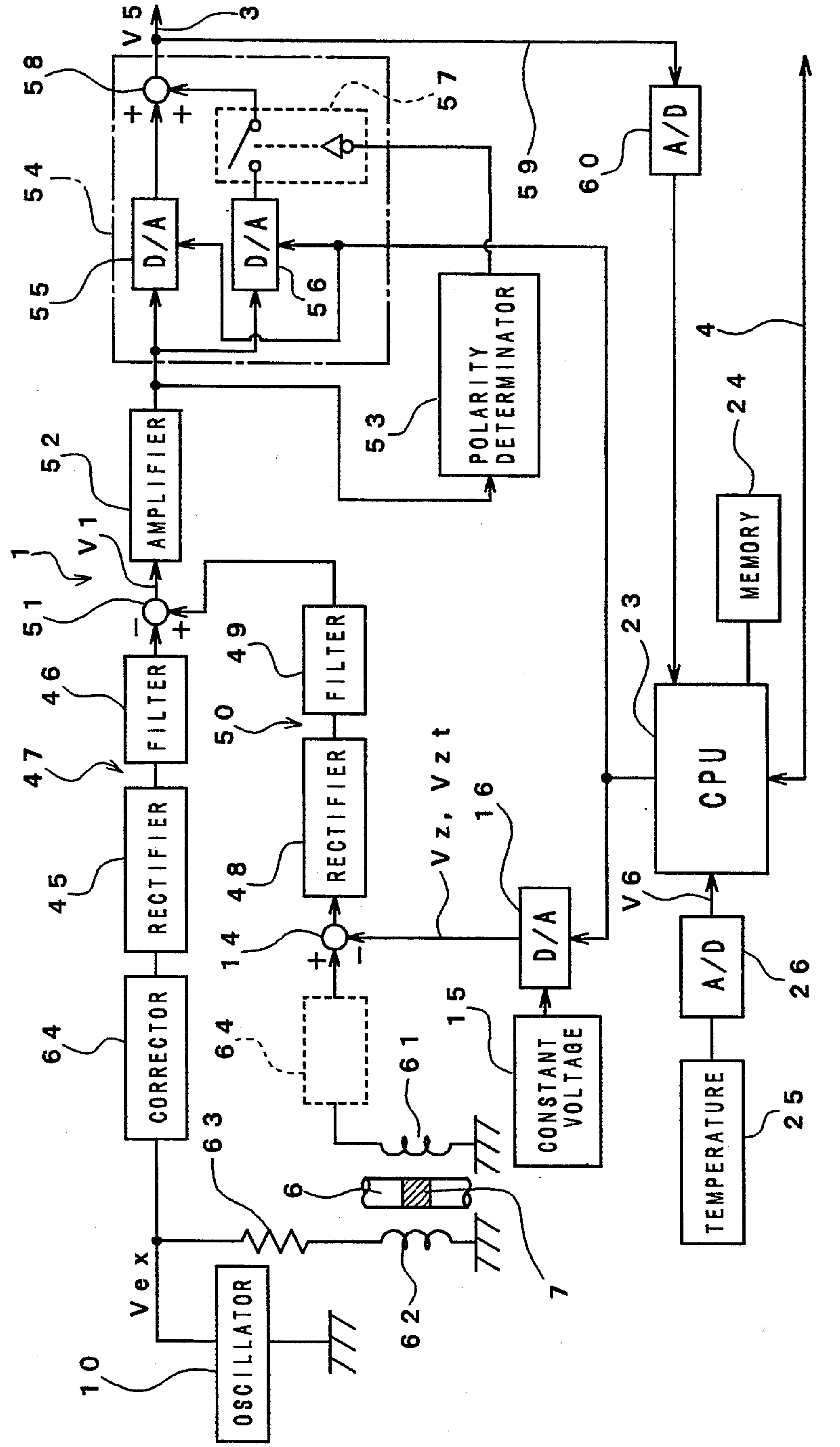
FIG. 6 is a block diagram showing a torque sensor of still another analog correction type.

FIG. 6 shows a torque sensor representing a still further modified embodiment of the invention. As is the case with the FIG. 4 embodiment, only a single magnetically anisotropic portion 7 is provided, with a sensing coil 61 and an excitation coil 62 arranged around the magnetically anisotropic portion 7. The excitation coil 62 is connected to an oscillation circuit 10, and a resistor 63 for uniformizing excitation current are connected in series between the oscillation circuit 10 and the excitation coil 62. An excitation voltage sensing circuit 47 is connected in parallel to the resistors 63 and excitation coil 62, and has a gain temperature characteristic correction circuit 64. In this embodiment, a differential amplifier 14 for zero-point correction is disposed in a torque sensing circuit 50 consisting of an output line from the sensing coil 61.

In the foregoing arrangement, the oscillation circuit 10 supplies excitation voltage Vex to the serially interconnected resistor 63 and excitation coil 62. When torque is applied to the torque sensing shaft 6, there occurs a change in the magnetic permeability of the magnetically anisotropic portion 7 and accordingly the impedance of the coil is varied, whereby the magnitude of the applied torque is determined.

It is possible to construct torque sensors of different capacities using an identical circuit. For that purpose, torque sensing shafts of different diameters may be used. In that case, coil impedance will also change accordingly. In the present embodiment, however, as is the case with the FIG. 2 and FIG. 3 embodiments, the presence of the sensing coil 61 and excitation coil 62 eliminates the necessity of the resistance value of the serial resistor 63 being made substantially equal to the impedance of the excitation coil 62 as in the FIG. 4 and FIG. 5 embodiments where only single coil is applied, even when there should occur a change in the impedance of the excitation coil 62. Therefore, by setting the magnitude of excitation voltage Vex and resistance value of the resistors 63 so that the value of excitation current flowing in the excitation coil 62 will be generally uniform, it is possible to insure that a detection voltage proportional to the product of the number of turns of the sensing coil 61 and excitation current appears, said detection voltage being variable with high sensitivity according to the torque applied to the torque sensing shaft 6. Further, by increasing the number of turns of the sensing coil 61 it is possible to provide greater sensing voltage for same excitation voltage, whereby a torque sensor having good performance characteristics and less subject to the influence of noise and/or drift in the torque sensing circuit can be obtained.

As is the case with the FIG. 4 embodiment, when there occurs a change in excitation voltage Vex, output V1 of the differential amplifier 51 will remain unchanged.

It may be arranged that measurement is previously made with respect to the temperature characteristics of individual outputs. Then, a correction constant for the gain temperature characteristic correction circuit 64 is determined so that the output of the differential amplifier 51 will be zero in the case of torque zero where no torque is applied to the shaft 6. By so arranging it is possible to insure that when a temperature change occurs at the torque sensor, coarse adjustment for zero-point temperature correction will be effected in response to the temperature change. Fine adjustment for zero-point temperature correction is effected by signals Vz, Vzt which are supplied from a D/A converter 16 to a differential amplifier 14 disposed in the torque detection circuit 50.

In the above described embodiment, a gain temperature characteristic correction circuit 64 is provided in the excitation voltage detection circuit 47. Alternatively, this gain temperature characteristic correction circuit 64 may be disposed in the detection circuit 50 as shown by broken line in FIG. 6, in which case it will function as well.

Figure 7:
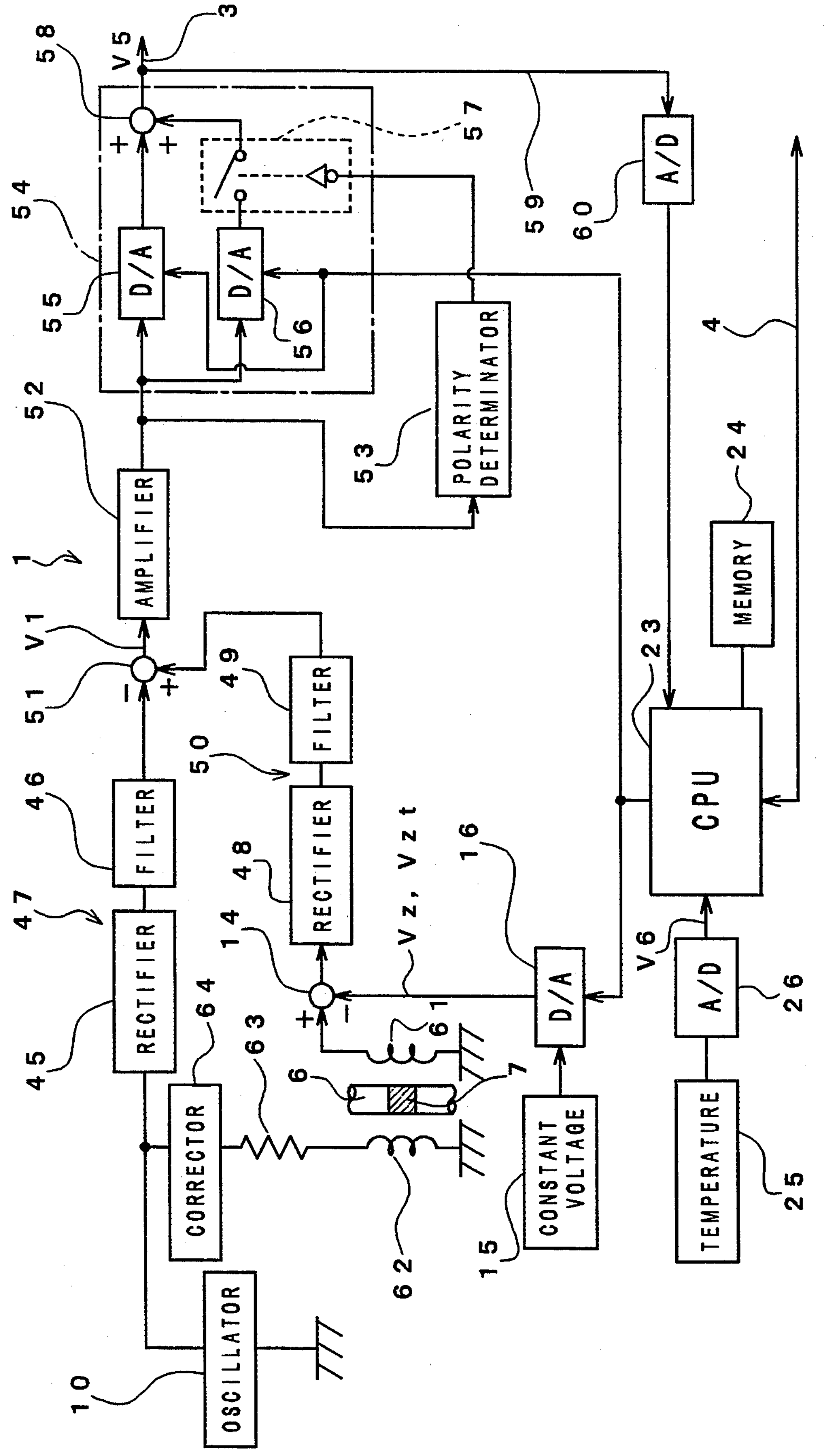
FIG. 7 is a block diagram showing a modified form of the torque sensor shown in FIG. 6.

FIG. 7 shows a modified form of the embodiment shown in FIG. 6. In this modified form, the gain temperature characteristic correction circuit 64 is disposed in a serial circuit comprising a resistor 63 and an excitation coil 62. In other respects, its construction is same as that shown in FIG. 6.

Figure 8:
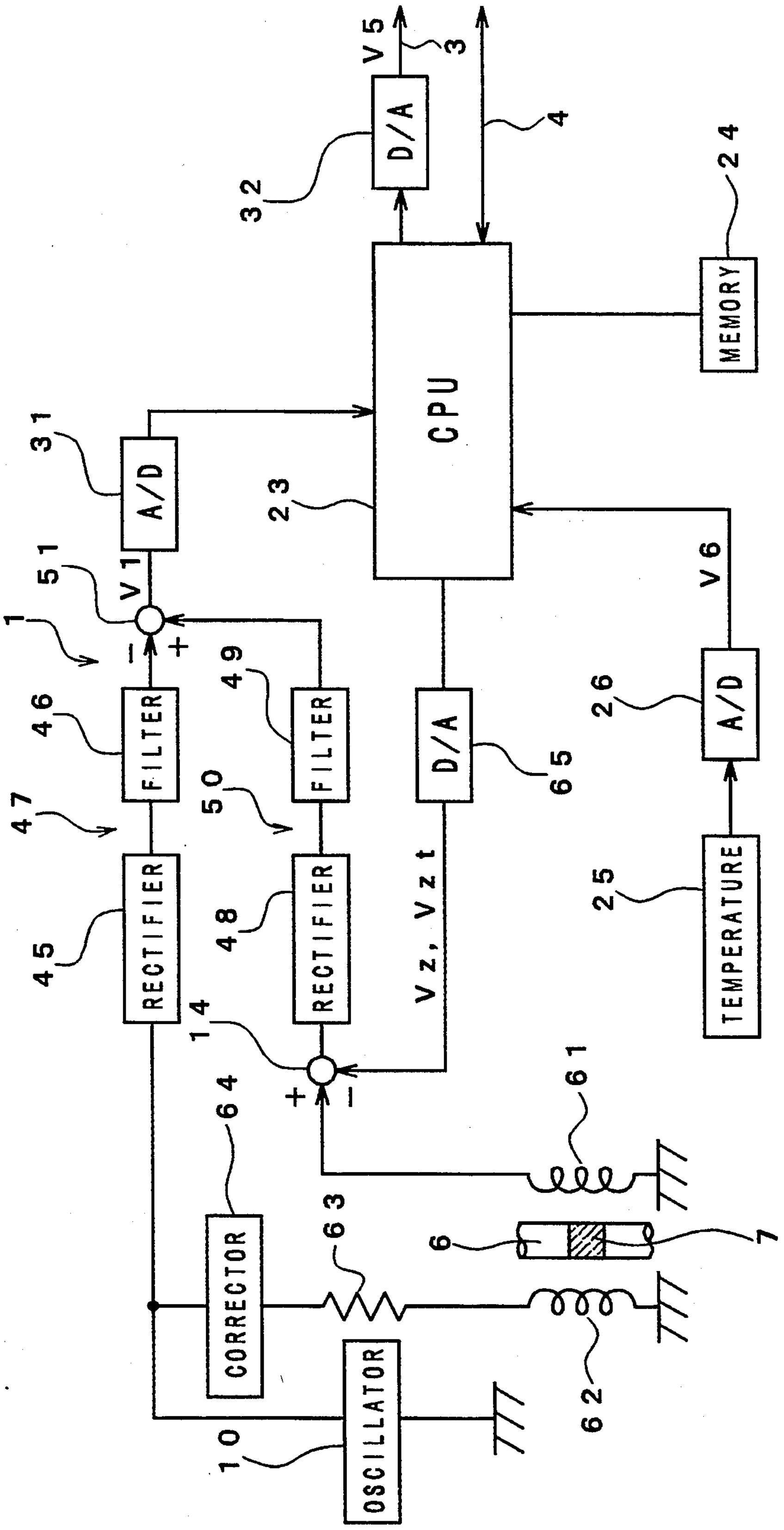
FIG. 8 is a block diagram showing a torque sensor of still another digital correction type.

FIG. 8 shows a modified embodiment of the invention wherein a detection coil 61 and an excitation coil 62 are arranged in same manner as in FIG. 7, but wherein a digital correction type arrangement is adopted as in FIG. 3 and FIG. 5 embodiments. In this embodiment, signals Vz, Vzt are supplied from a CPU 23 to a differential amplifier 14 via a D/A converter 65 whereby fine adjustment for zero-point temperature correction is effected. Other operational features are same as those illustrated in FIGS. 3, 5 and 7.

Figure 9:
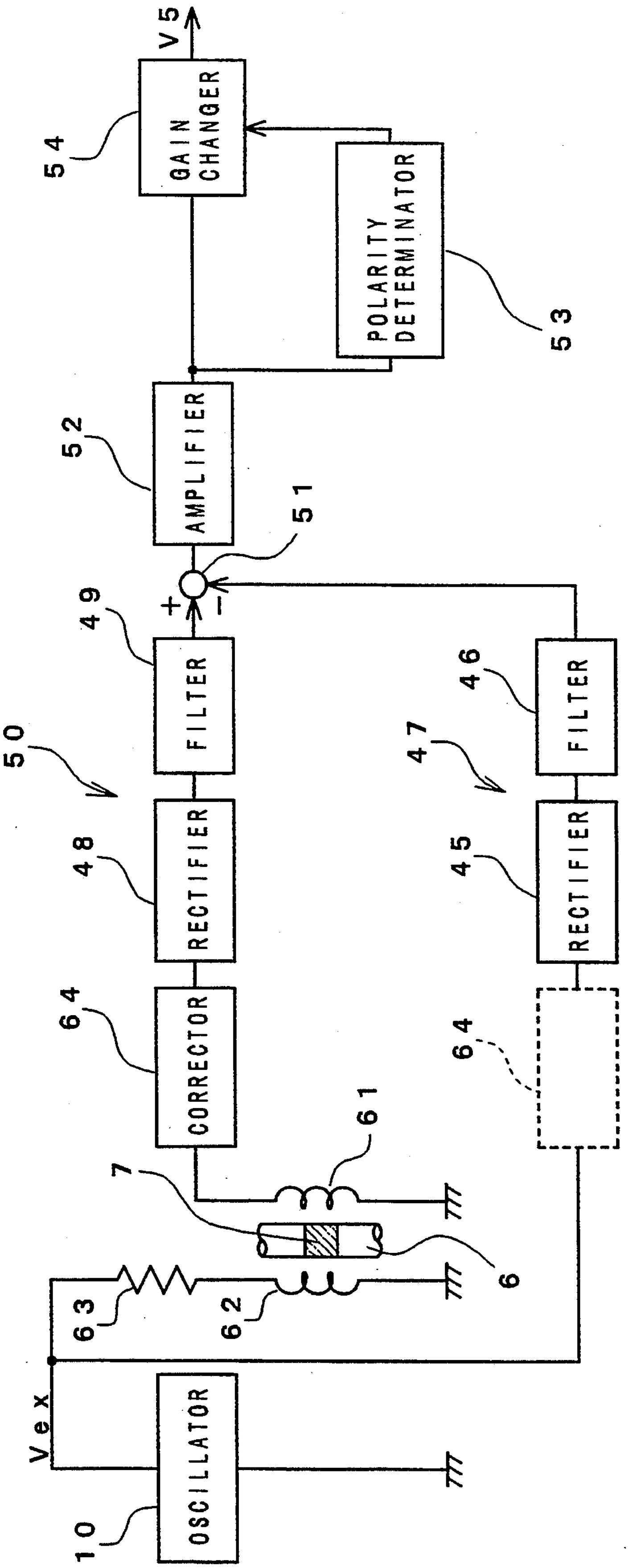
FIG. 9 is a block diagram showing a torque sensor in another embodiment which has a simplified form of the circuit arrangement of the FIG. 6 embodiment.

FIG. 9 shows another embodiment in which the circuit configuration of the FIG. 6 embodiment is simplified. In the circuit of FIG. 9, the CPU 23 in FIG. 6 and the characteristic check device 2 in FIG. 1 are omitted. Therefore, operations based on signals from the CPU 23 and characteristic check device 2 are not carried out. Operations to be carried out by the arrangement of the embodiment are limited to: sensitivity improvement via resistor 63, measurement error correction by excitation voltage detection circuit 47, zero-point variation correction by gain temperature characteristic correction circuit 64, and clockwise and counterclockwise torque error corrections by polarity determining circuit 53 and gain changeover circuit 54

In contrast with FIG. 6 circuit, the circuit of FIG. 9 is particularly suitable for use in those fields of the art in which achievement of practical accuracy can be expected merely through comparatively simple corrections.

Figure 10:
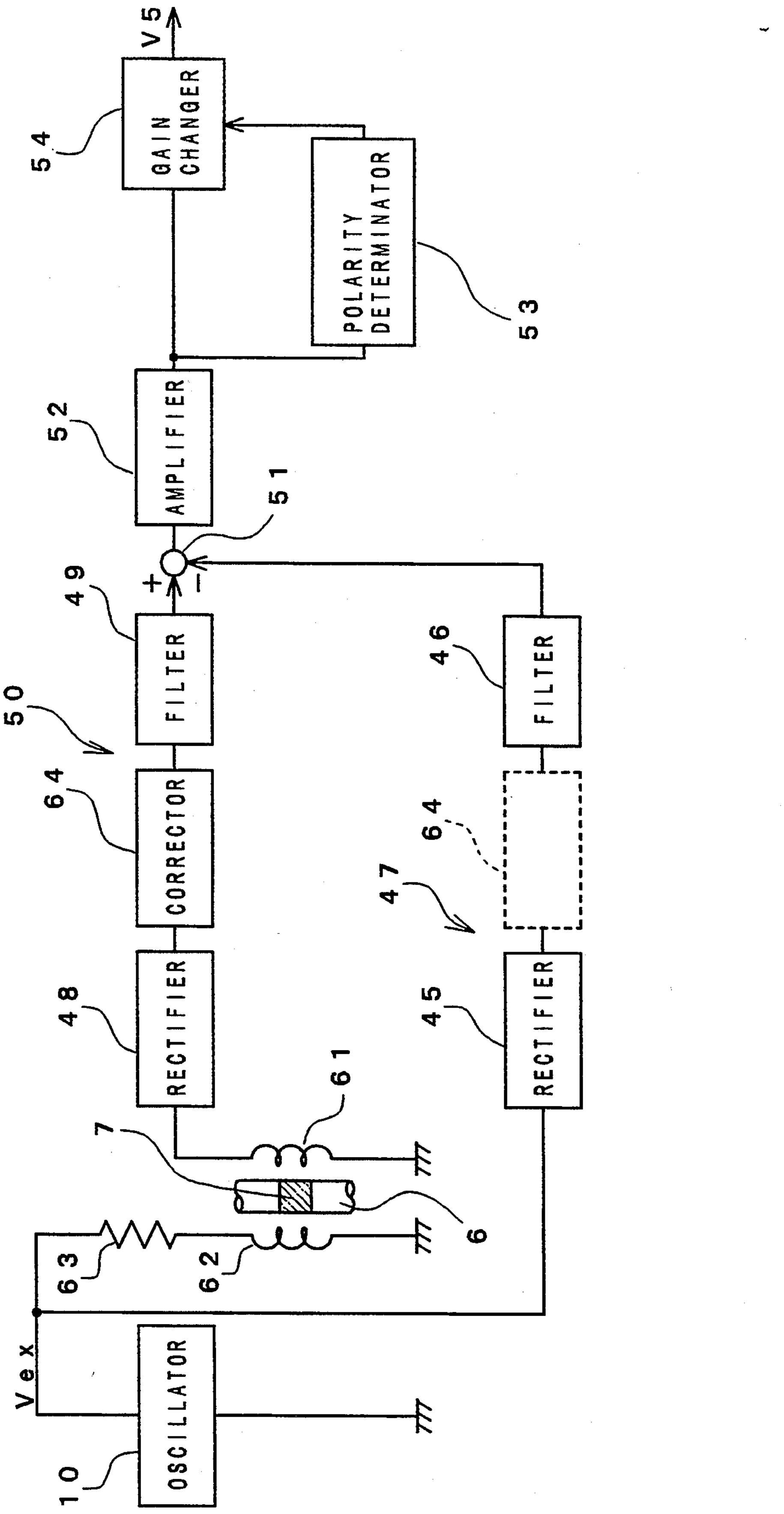
FIG. 10 is a block diagram of a first modified form of the circuit shown in FIG. 9.

FIG. 10 shows a first modified form of the circuit shown in FIG. 9. In this circuit, the gain temperature characteristic correction circuit 64 is provided between the rectification circuit 48 and the filter 49 in the torque detection circuit 50, or between the rectification circuit 45 and the filter 46 in the excitation voltage detection circuit 47. In other respects, the arrangement is same as that of the FIG. 9 circuit.

Figure 11:
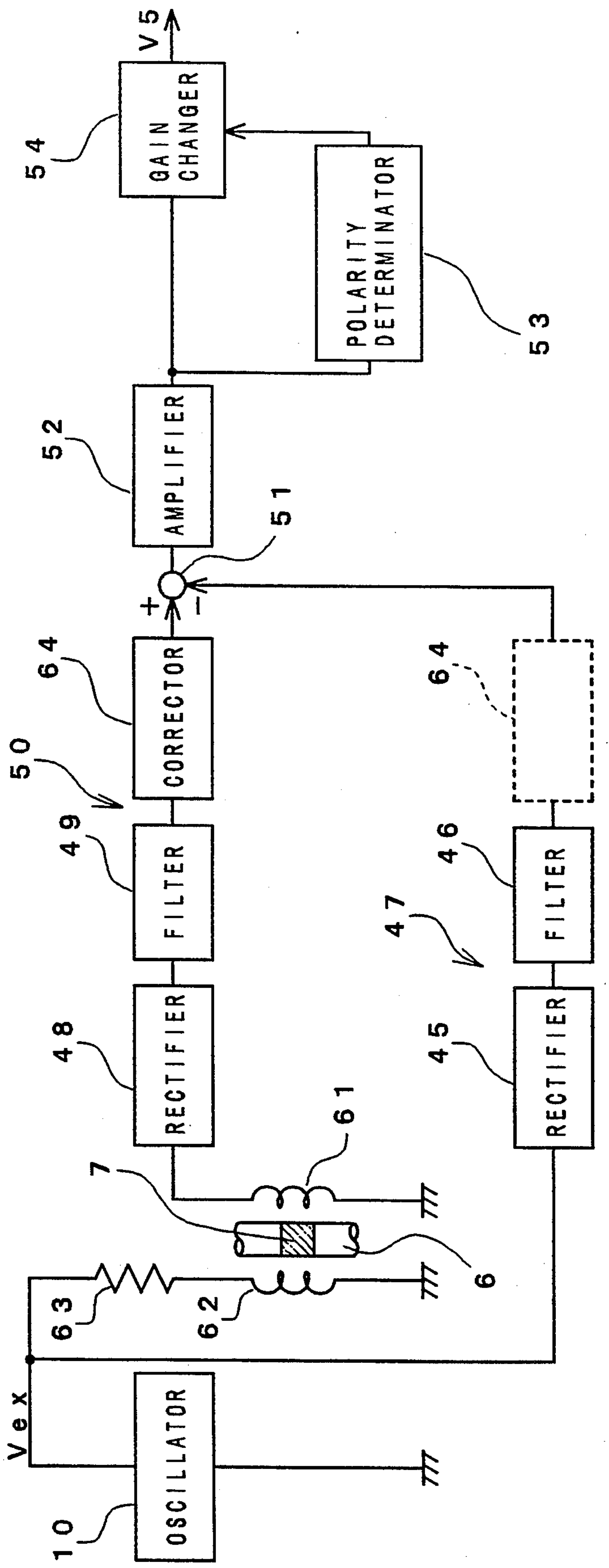
FIG. 11 is a block diagram of a second modified form of the circuit shown in FIG. 9.

FIG. 11 shows a second modified form of the circuit shown in FIG. 9. In this circuit, the gain temperature characteristic correction circuit 64 is provided on the output side of the filter 49 in the torque detection circuit 50, or on the output side of the filter 46 in the excitation voltage detection circuit 47. In other respects, the arrangement is same as that of the FIG. 9 circuit.

Figure 12:
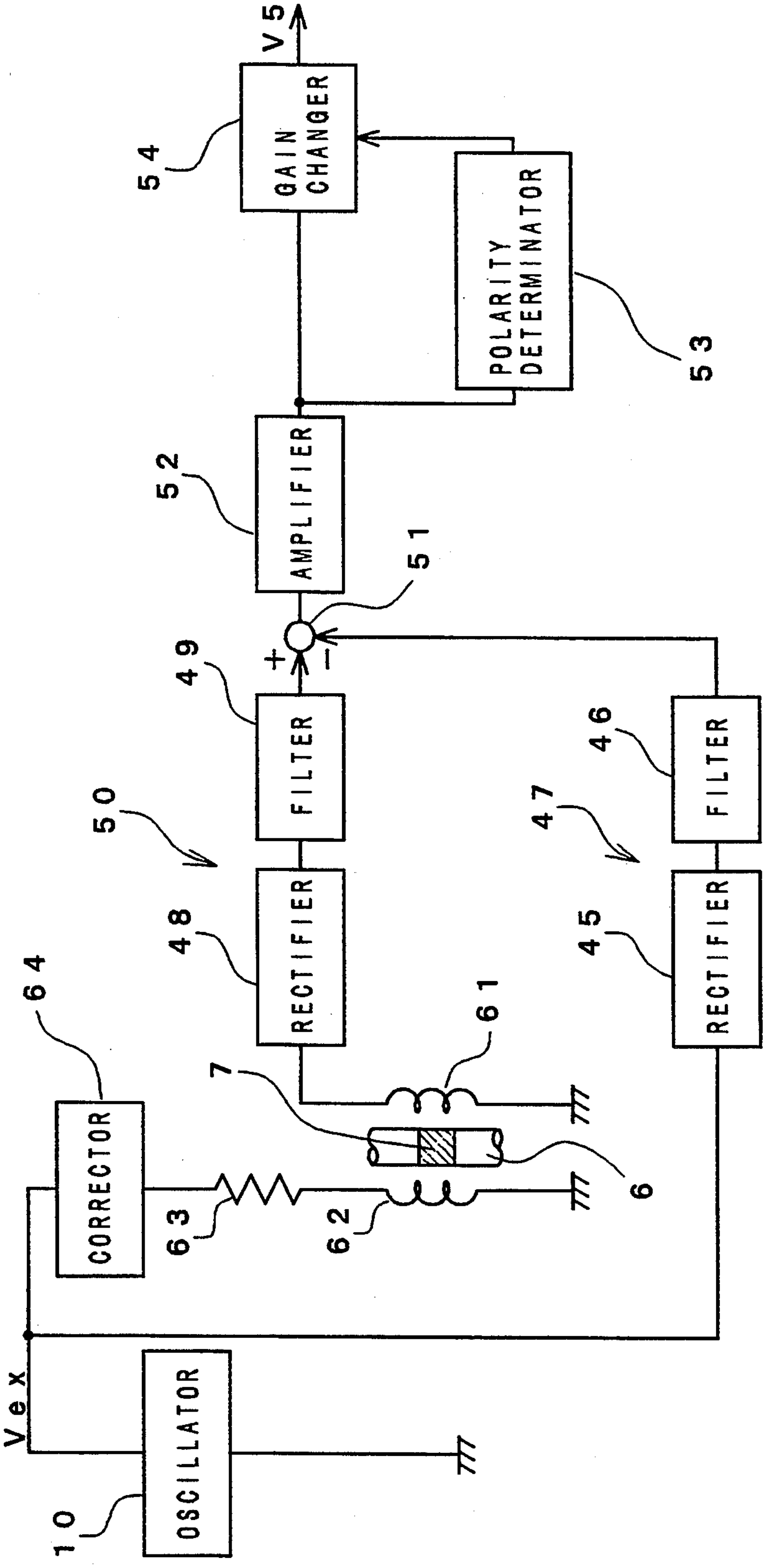
FIG. 12 is a block diagram of a third modified form of the circuit shown in FIG. 9.

FIG. 12 shows a third modified form of the circuit shown in FIG. 9. In this circuit, the gain temperature characteristic correction circuit 64 is provided between the resistor 63 and the oscillation circuit 10, as is the case with the circuits in FIGS. 7 and 8. In this modified form, the gain temperature characteristic correction circuit 64 may consist of a temperature sensitive resistor whose resistance value varies considerably in response to temperature changes. In other respects, the arrangement is same as that of the FIG. 9 circuit.

It is clearly understood that the technical concept of the present invention is applicable to various kinds of sensors other than the foregoing torque sensor, such as load cells and pressure sensors.

What is claimed is:

1. A torque measuring system including:

a torque sensor capable of detecting the magnitude of a torque applied to a torque sensing shaft and producing a torque signal therefor, said torque sensor being electrically connectable to and electrically releasable from a characteristic check device isolated therefrom, said torque sensor being operable to alternatively set, by means of a switching signal sent from the characteristic check device while the device is connected to the torque sensor, a correction mode for correcting the detecting characteristics thereof and a measurement mode for outputting a torque signal from the torque sensor whose detecting characteristics have been corrected in the correction mode, said torque sensor being isolatable from the characteristic check device for use in the measurement mode, said characteristic check device being able to collect check data with respect to the torque sensor in the correction mode and to compute characteristic correction data for correction of the detecting characteristics of the torque sensor on the basis of the collected check data, and said torque sensor including memory means for recording thereinto, in the correction mode, characteristic correction data from the characteristic check device and for causing the characteristic correction data to be read therefrom in the measurement mode for correction of the detecting characteristics.

2. A torque measuring system according to claim 1, wherein the torque sensor includes means for reading from the memory means, in the measurement mode, the characteristic correction data and effecting with respect to the torque signal at least one kind of correction of those including zero-point correction, sensitivity correction, correction of a zero-point variation due to a temperature change and correction of a sensitivity variation due to the temperature change.

3. A torque measuring system according to claim 1, wherein:

the torque sensor includes:

a single magnetically anisotropic portion formed on the periphery of a torque sensing shaft;

a coil disposed around the magnetically anisotropic portion;

means for supplying an excitation voltage to the coil;

means for deriving a torque detection signal from the coil; and resistance means provided in series between said coil and said excitation voltage supply means and having a resistance value substantially equivalent to the impedance of said coil.

4. A torque measuring system according to claim 3, further comprising:

means for deriving an excitation voltage signal from the value of excitation voltage from the excitation voltage supply means; and operation means operative to calculate the difference between the torque detection signal and the excitation voltage signal to compensate for variations in the value of excitation voltage.

5. A torque measuring system according to claim 4, further comprising temperature characteristic compensating means for adjusting gain in at least one of the torque detection signal and the excitation voltage signal to compensate for a measurement error due to temperature change.

6. A torque measuring system according to claim 3, further comprising:

means for detecting the direction of the torque applied to the torque sensing shaft; and means for switching gain in the torque detection signal according to the direction of the applied torque.

7. A torque measuring system according to claim 1, wherein:

the torque sensor includes:

a single magnetically anisotropic portion formed on the periphery of the torque sensing shaft;

an excitation coil and a sensing coil which are arranged around the magnetically anisotropic portion;

means for deriving a torque detection signal from the output of the sensing coil;

means for supplying an excitation voltage to the excitation coil; and resistance means disposed in series between said excitation coil and said excitation voltage supply means for making excitation current constant.

8. A torque measuring system according to claim 7, further comprising:

means for deriving an excitation voltage signal from the value of the excitation voltage from the excitation voltage supply means; and operation means operative to calculate the difference between the torque detection signal and the excitation voltage signal to compensate for variations in the value of the excitation voltage.

9. A torque measuring system according to claim 7, further comprising temperature characteristic compensating means for adjusting gain in at least one of the torque detection signal and the excitation voltage signal to compensate for a measurement error due to temperature change.

10. A torque measuring system according to claim 7, further comprising:

means for detecting the direction of the torque applied to the torque sensing shaft; and means for switching gain in the torque detection signal according to the direction of the applied torque.

11. A torque measuring system comprising:

a single magnetically anisotropic portion formed on the periphery of a torque sensing shaft;

an excitation coil and a sensing coil which are arranged around the magnetically anisotropic portion;

means for deriving a torque detection signal from the output of the sensing coil;

means for supplying an excitation voltage to the excitation coil; and resistance means disposed in series between said excitation coil and said excitation voltage supply means for making excitation current constant.

12. A torque measuring system according to claim 11, further comprising:

means for deriving an excitation voltage signal from the value of the excitation voltage from the excitation voltage supply means; and operation means operative to calculate the difference between the torque detection signal and the excitation voltage signal to compensate for variations in the value of the excitation voltage.

13. A torque measuring system according to claim 11, further comprising temperature characteristic compensating means for adjusting gain in at least one of the torque detection signal and the excitation voltage signal to compensate for a measurement error due to temperature change.

14. A torque measuring system according to claim 11, further comprising:

means for detecting the direction of the torque applied to the torque sensing shaft; and means for switching gain in the torque detection signal according to the direction of the applied torque.

* * * * *